(12) United States Patent
Matthews et al.

(10) Patent No.: US 11,219,951 B2
(45) Date of Patent: Jan. 11, 2022

(54) MULTI-MODE LASER DEVICE FOR METAL MANUFACTURING APPLICATIONS

(71) Applicant: Directed Metal 3D, S.L., Jae'n (ES)

(72) Inventors: Brian Matthews, Las Vegas, NV (US); Lesther Moreira Osorio, Las Vegas, NV (US); Lukas Hoppe, Bremen (DE)

(73) Assignee: Directed Metal 3D, S.L., Jaén (ES)

( * ) Notice: Subject to any disclaimer, the term of this patent is extended or adjusted under 35 U.S.C. 154(b) by 313 days.

(21) Appl. No.: 16/683,236

(22) Filed: Nov. 13, 2019

(65) Prior Publication Data

US 2021/0001402 A1 Jan. 7, 2021

Related U.S. Application Data

(60) Provisional application No. 62/870,651, filed on Jul. 3, 2019.

(51) Int. Cl.
*B33Y 30/00* (2015.01)
*B23K 26/34* (2014.01)
(Continued)

(52) U.S. Cl.
CPC .............. *B22F 10/00* (2021.01); *B23K 26/21* (2015.10); *B23K 26/355* (2018.08);
(Continued)

(58) Field of Classification Search
CPC ................................. B33Y 10/00; B33Y 30/00; B23K 26/34–342; B23K 26/36–362;
(Continued)

(56) References Cited

U.S. PATENT DOCUMENTS

| 4,323,756 A | 4/1982 | Brown et al. |
|---|---|---|
| 7,765,022 B2 | 7/2010 | Mazumder et al. |

(Continued)

FOREIGN PATENT DOCUMENTS

| CN | 107083550 A | 8/2017 |
|---|---|---|
| CN | 108637251 A | 10/2018 |

(Continued)

OTHER PUBLICATIONS

Jyotirmoy Mazumder, Fabrication of 3D components by laser-aided direct metal deposition, SPIE Proceedings vol. 5706, Mar. 8, 2005, Abstract, https://spie.org/Publications/Proceedings/Paper/10.1117/12.601652?SSO=1.

*Primary Examiner* — Michael A Laflame, Jr.
(74) *Attorney, Agent, or Firm* — Gerald R. Prettyman

(57) ABSTRACT

Disclosed is a multi-mode laser device for metal manufacturing applications including additive manufacturing (AM), laser cladding, laser welding, laser cutting, laser texturing and laser polishing. The multi-mode laser device configures off-axis, solid-state diode or diode-pumped lasers into an array to perform precision controlled, direct metal deposition printing, cladding, laser welding, laser cutting, laser texturing and laser polishing through a single device. Dual-mode printing, cladding and welding capability using metal wire and powder feedstock sources in the same device is provided with in-line control, precision wire feed driver/controller, adjustable shield gas diffuser, and nozzles tailored to wire feedstock diameter.

30 Claims, 16 Drawing Sheets

(51) Int. Cl.
  *B23K 26/36* (2014.01)
  *B23K 26/21* (2014.01)
  *B23K 26/14* (2014.01)
  *B22F 10/00* (2021.01)
  *B23K 26/352* (2014.01)
  *B23K 26/38* (2014.01)
  B29C 64/268 (2017.01)
  B23K 26/06 (2014.01)
  B22F 10/10 (2021.01)

(52) U.S. Cl.
  CPC .......... *B23K 26/3576* (2018.08); *B23K 26/38* (2013.01); *B22F 10/10* (2021.01); *B23K 26/06* (2013.01); *B29C 64/268* (2017.08); *B33Y 30/00* (2014.12)

(58) Field of Classification Search
  CPC .... B23K 26/21–244; B23K 26/14–142; B23K 26/38–382
  See application file for complete search history.

(56) References Cited

U.S. PATENT DOCUMENTS

| | | | |
|---|---|---|---|
| 2003/0100824 A1* | 5/2003 | Warren | B05C 5/0216 |
| | | | 600/407 |
| 2012/0074110 A1* | 3/2012 | Zediker | B23K 26/1224 |
| | | | 219/121.72 |
| 2012/0138586 A1* | 6/2012 | Webster | B23K 15/085 |
| | | | 219/121.64 |
| 2014/0014632 A1* | 1/2014 | Cathry | B23K 26/042 |
| | | | 219/121.67 |
| 2017/0050268 A1 | 2/2017 | Fujiya | |
| 2017/0197280 A1* | 7/2017 | Timmerman | B23K 26/0876 |
| 2020/0061740 A1* | 2/2020 | Okuma | B23K 26/032 |
| 2020/0276673 A1* | 9/2020 | Sturmer | B22F 12/00 |
| 2021/0060861 A1* | 3/2021 | Ream | B29C 64/25 |

FOREIGN PATENT DOCUMENTS

| | | |
|---|---|---|
| CN | 109338359 A | 2/2019 |
| WO | 2011082582 A1 | 7/2011 |

* cited by examiner

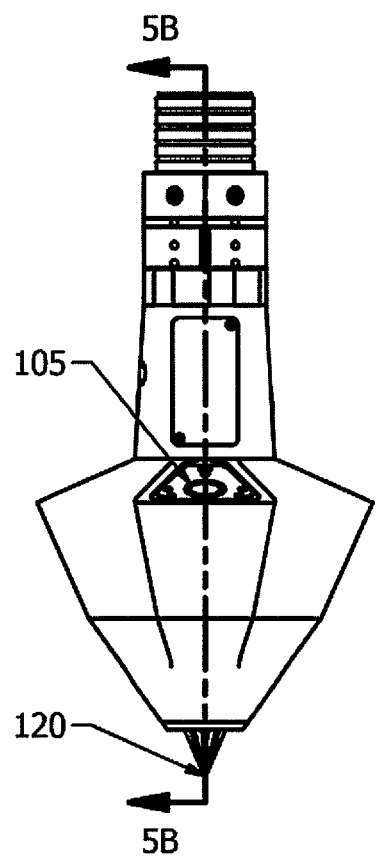
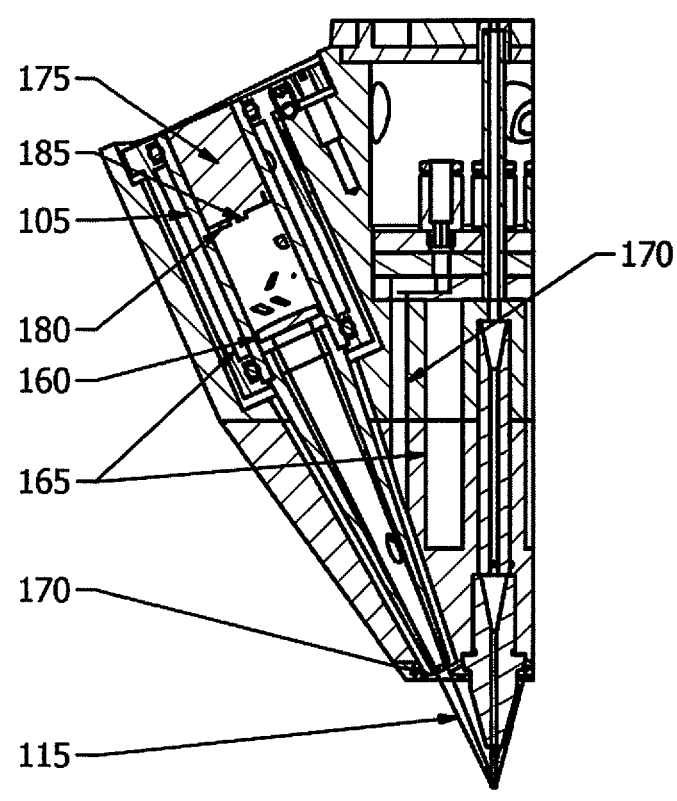
FIG. 5A
FIG. 5B

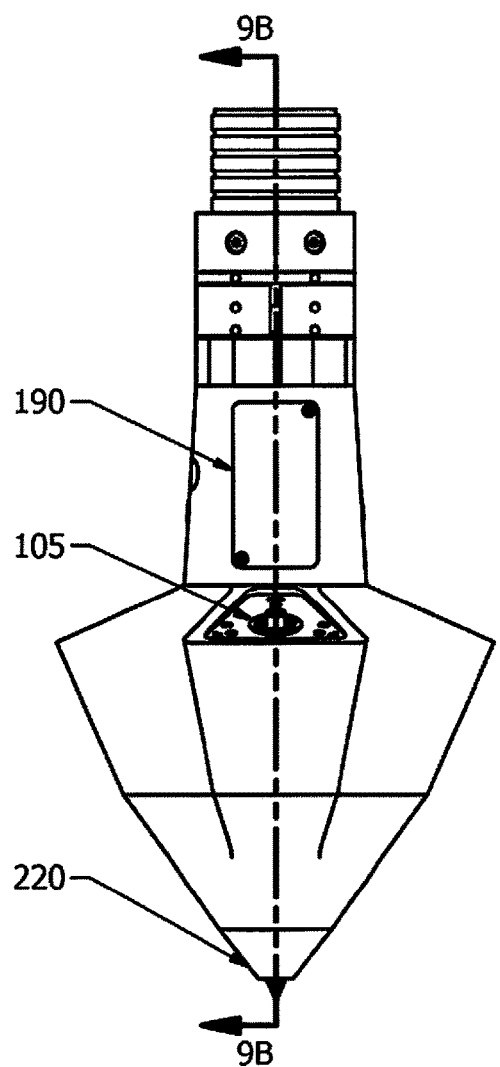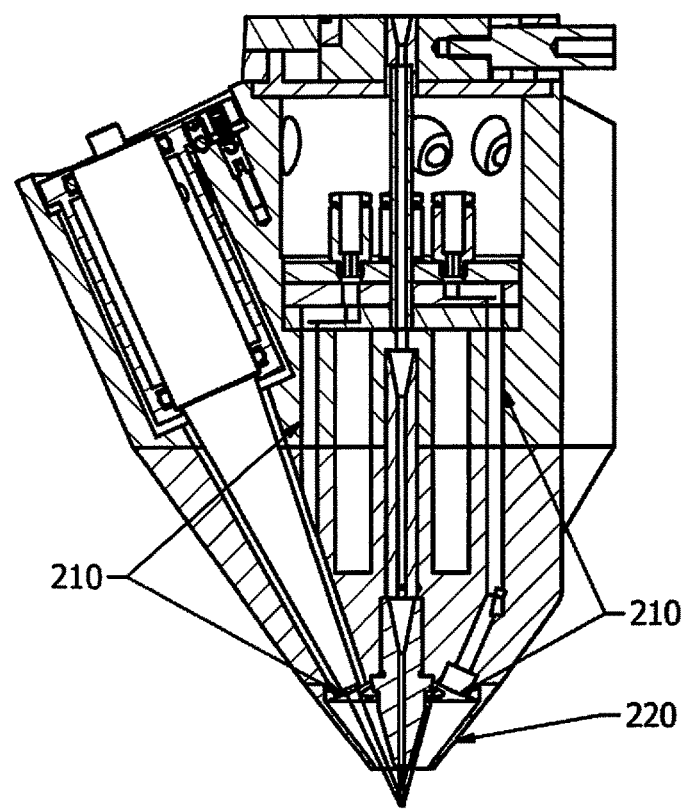
FIG. 9A
FIG. 9B

MULTI-MODE LASER DEVICE FOR METAL MANUFACTURING APPLICATIONS

CROSS-REFERENCE TO RELATED APPLICATION

This application claims the benefit of priority of U.S. Provisional Patent Application 62/870,651 filed Jul. 9, 2019, and titled "MULTI-MODE LASER DEVICE FOR METAL MANUFACTURING APPLICATIONS," the disclosure of which is incorporated by reference.

STATEMENT REGARDING FEDERALLY SPONSORED RESEARCH OR DEVELOPMENT

Not Applicable

BACKGROUND OF THE INVENTION

Field of Invention

This invention relates generally to the field of laser-based manufacturing using laser-based additive manufacturing (AM), laser cladding, laser welding, laser cutting, laser texturing and laser polishing methods. The laser AM, laser cladding and laser welding (non-autogenous mode) processes employ a direct metal deposition (DMD) process utilizing a distributed laser light source to focus multiple laser beams onto a working surface where the laser focal point intersects with metal feed material (wire and/or powder) to form a metal layered construct on a substrate under computer control. The laser welding (autogenous mode), laser cutting, laser texturing and laser polishing processes utilize a distributed laser light source to focus multiple laser beams onto a work surface where the laser focal point(s) intersect with the metal substrate to enable welding, (autogenous), cutting, texturing or polishing of the work surface under computer control.

Description of Related Art

Fabrication of three-dimensional metallic components using a layer-by-layer laser energy source deposition method was first reported in 1978 by Breinan and Kear. In 1982, U.S. Pat. No. 4,323,756 was issued to Brown et al., describing a method for the production of bulk, rapidly solidified metallic particles, with a particular application in the fabrication of certain gas turbine engine components including discs and knife-edge air seals. Such three-dimensional, laser-assisted metal deposition processes comprise a field of additive manufacturing (AM) termed Direct Metal Deposition (DMD).

Recently, various groups around the world have been working on different types of layered manufacturing techniques for fabrication of metallic components.

Recent innovations include the integration of lasers with multi-axis computer numeric control (CNC) machines using a laser to focus a beam on the metal feed material through a DMD nozzle to fabricate a three-dimensional component. Computer Aided Design (CAD) and Computer Aided Manufacturing (CAM) software is integrated with the DMD process to drive the nozzle to fabricate precise three-dimensional component renderings. Previous approaches utilize a nozzle where the laser beam enters through the center of the nozzle with the metal feed material introduced through the nozzle via a coaxial or side feed mechanism. U.S. Pat. No. 7,765,022 introduced an approach utilizing this configuration using a diode laser source in 2010. Use of a diode laser source provides advantages by improving response times to power adjustments to precisely control the DMD process. In U.S. Pat. No. 7,765,022, a central diode laser system is combined with an optical monitor and a side-mounted powder/wire/tape delivery system. In this approach, either wire or powder feed material is used, but no capability is provided for use of wire or powder feed material within the same DMD device. Facilitation of wire or powder feed material through a central axis in the same DMD device combined with use of an array of off-axis, diode laser fibers or diode-pumped solid-state laser fibers to melt the feed material has not been presented, except by reference to the cross-referenced related applications.

Pat. CN109338359A describes a high-speed laser cladding head for precise matching of multiple metal powder streams a multiple laser beams in which a high-speed laser coating head participates, which matches multiple metal powder streams and multiple laser beams so that the rate of use of metallic powder in a head is as high as possible and without jams. The coating head comprises a column fixing base, a transition connection sleeve and a powder feeding head.

This device has a series of limitations, including the following:

It includes external lasers in which the energy is transmitted by optical fiber to the head, causing loss of energy and the possibility of fiber breakage and fiber connector damage from heat, mechanical interactions, and reflection of laser radiation during operation.

The system described applies only to powder cladding operations, not applicable to additive manufacturing, wire or power cladding, laser welding, laser cutting, laser texturing and laser polishing.

The system described applies only to powder cladding operations, not applicable to additive manufacturing, wire or power cladding, laser welding, laser cutting, laser texturing and laser polishing.

The system does not address laser reflection protection. This can cause the destruction of the components that the lasers generate by shortening the last life of the system.

The number of lasers participating in the invention is 2 or 3 lasers.

The system is only capable of processing powder.

The system does not described inert gas distribution which is a critical aspect of the process.

The system applies only to multi-beam powder nozzles.

The system does not address head connections.

These limitations are equally applicable to the documents WO 2011082582A1, CN 107083550A, CN108637251A, and US 2017050268A1.

SUMMARY OF THE INVENTION

Disclosed is a multi-mode laser device for metal manufacturing applications in a compact multi-laser head providing a unique method of delivering laser power, wire and powder deposition, inline process controls, wire feed driver/precision control, and shield gas through a single device. The multi-mode laser device provides a compact solution for a wide range of laser-based metal manufacturing applications facilitating its implementation within multiple metal printing platforms, including use in 3D metal printers, CNC machines, laser cells, laser-safe enclosures, and robotic and gantry systems. Other embodiments do not incorporate a broad-range multi-mode (e.g., generally a single or dual application mode such as AM/laser cladding), and use a laser entering through the center of the deposition head, with the material (wire or powder) entering coaxially or from the side.

The multi-mode laser device may be operated in a wide range of systems due to its compact size and its ability to operate in an open-air or inert atmosphere environment.

In the AM, laser cladding and laser welding (nonautogenous mode) embodiments, the deposition material enters through the center axis of the head with laser energy from multiple lasers angled to coincide with the material feed and work-piece at a precise focal point. Multiple fiber-coupled diode laser or fiber-coupled diode-pumped solid-state lasers (DPSSLs) provide high effective laser power. Each laser can be addressed under computer control independently providing the capable to adjust the power of each laser individually allowing shaping of the melt-pool. The design features the wire and powder feed material in separate channels through a coax arrangement with precision monitoring and adjustment of material feeds. The design includes multiple internal channels providing for coolant, shield gas, powder flow, and wire feed. Shield gas is delivered to protect optical components and to blanket the build surface through an adjustable configuration. Process feedback controls provide for continual adjustment of process parameters to optimize deposition. A compact conduit encloses supply lines including coolant, feed material, and shield, gas.

The single device consists of a feed deposition head, a plurality of off-axis laser beams, an inline process control system, an at least one off-axis, or coaxial, powder feed material nozzle, a wire feed driver and precision control capable of using wire feed material as a distance measuring probe, and a shield gas protection.

BRIEF DESCRIPTION OF THE DRAWINGS

FIG. 5A and FIG. 5B show a perspective and cut-away view of an internal fiber-coupled or fiber-free insertable laser assembly for an embodiment of a multi-mode laser device for metal manufacturing applications, illustrating the arrangement of the internal solid state diode laser(s), collimation and focusing optics, shield, gas protection, back-reflection protection, integrated aiming beam, and cooling system.

FIG. 9A and FIG. 9B show a perspective and cut-away view of an embodiment for a multi-mode laser device for metal manufacturing applications featuring its process gas distribution and supply channels to the working surface of the process, in conjunction with a detachable shield gas diffuser.

DETAILED DESCRIPTION OF THE INVENTION

Figure 1:
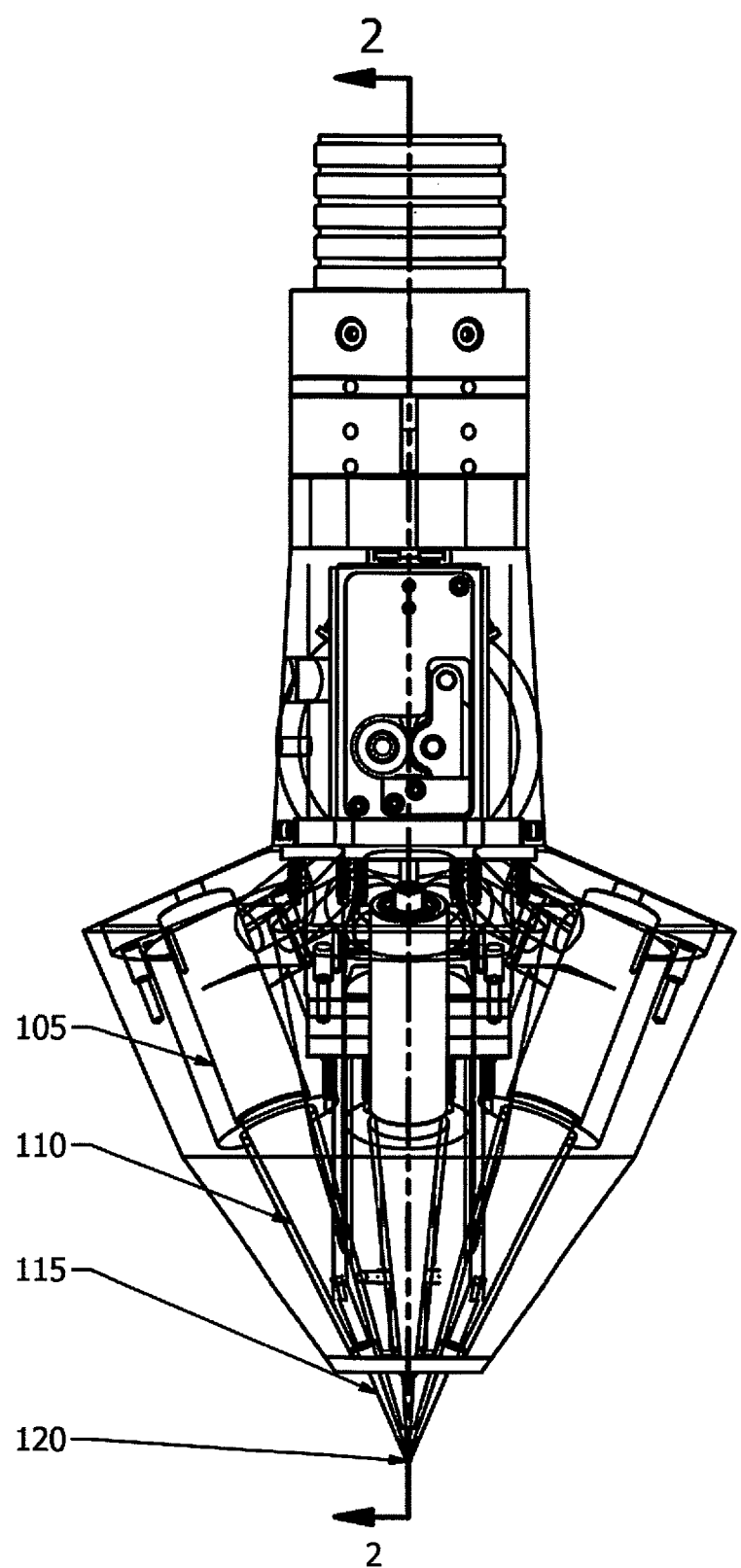
FIG. 1 shows a side view of an embodiment for a multimode laser device for metal manufacturing applications featuring its supply and laser connections.

FIG. 1 shows a side view of an embodiment for a multimode laser device for metal manufacturing applications featuring its supply and laser connections. Shown in FIG. 1 are off-axis laser light sources (105) including but not exclusively, external fiber-coupled diode lasers, external fiber-coupled diode-pumped solid state lasers (DPSSLs), or internal fiber-coupled or fiber-free solid-state diode lasers, off-axis laser beam apertures (110), off-axis laser light beams (115), a wire material feed (125), and a focal point for wire, powder and laser beams (120).

As shown in FIG. 1, a wire feed material (125) is used for metal deposition by combining with a plurality of off-axis laser-fiber sources at the focal point for wire, powder and laser beams (120). In some embodiments, the wire feed supply channel is capable of supplying shield gas though the deposition head. Not shown in FIG. 1 is the possible concurrent or simultaneous supply and feed of metal powder. The deposition feed stock emerges as a material feed towards a focal point for wire, powder and laser beams (120).

Figure 2:
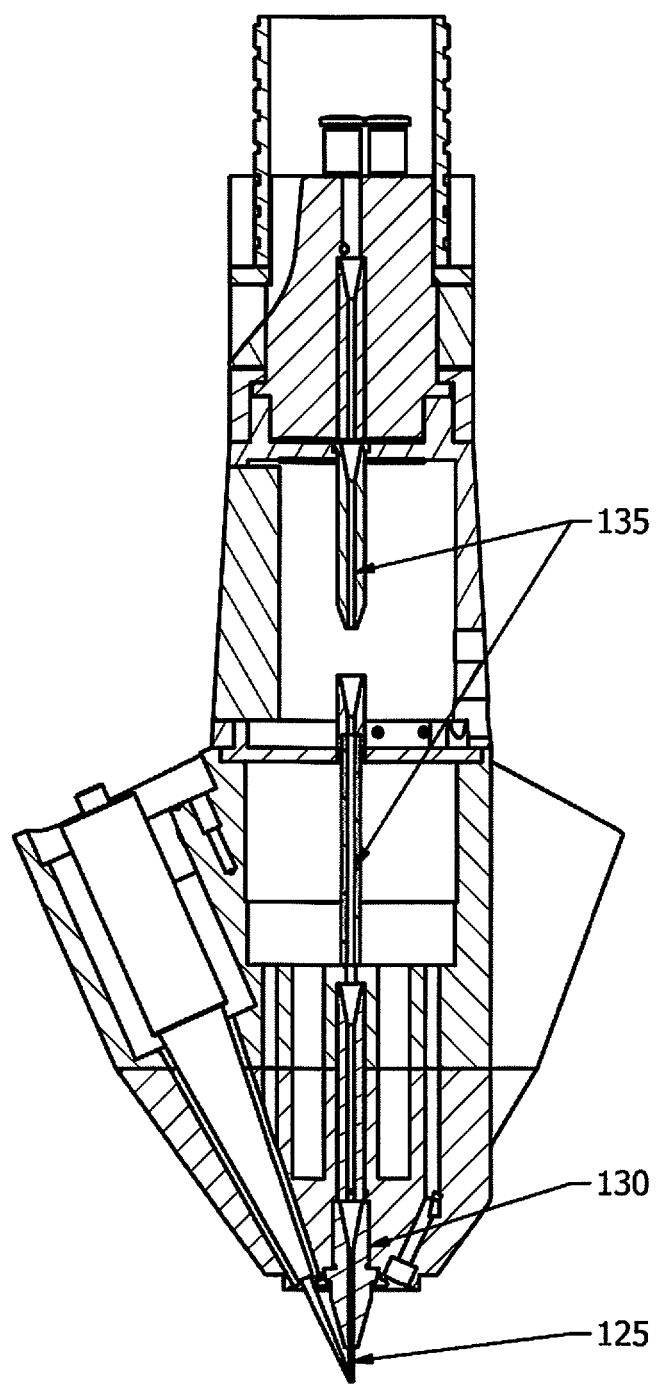
FIG. 2 shows a cut-away side view of an embodiment for a multi-mode laser device for metal manufacturing applications featuring its supply and laser connections.

FIG. 2 shows a cut-away side view of an embodiment for a multi-mode laser device for metal manufacturing applications featuring its supply and laser connections. In addition to being a cut-away view, FIG. 2 shows additional features from FIG. 1. Shown in FIG. 2 are a central axis wire material guide channel (135) and a central deposition nozzle (130).

Figure 3A:
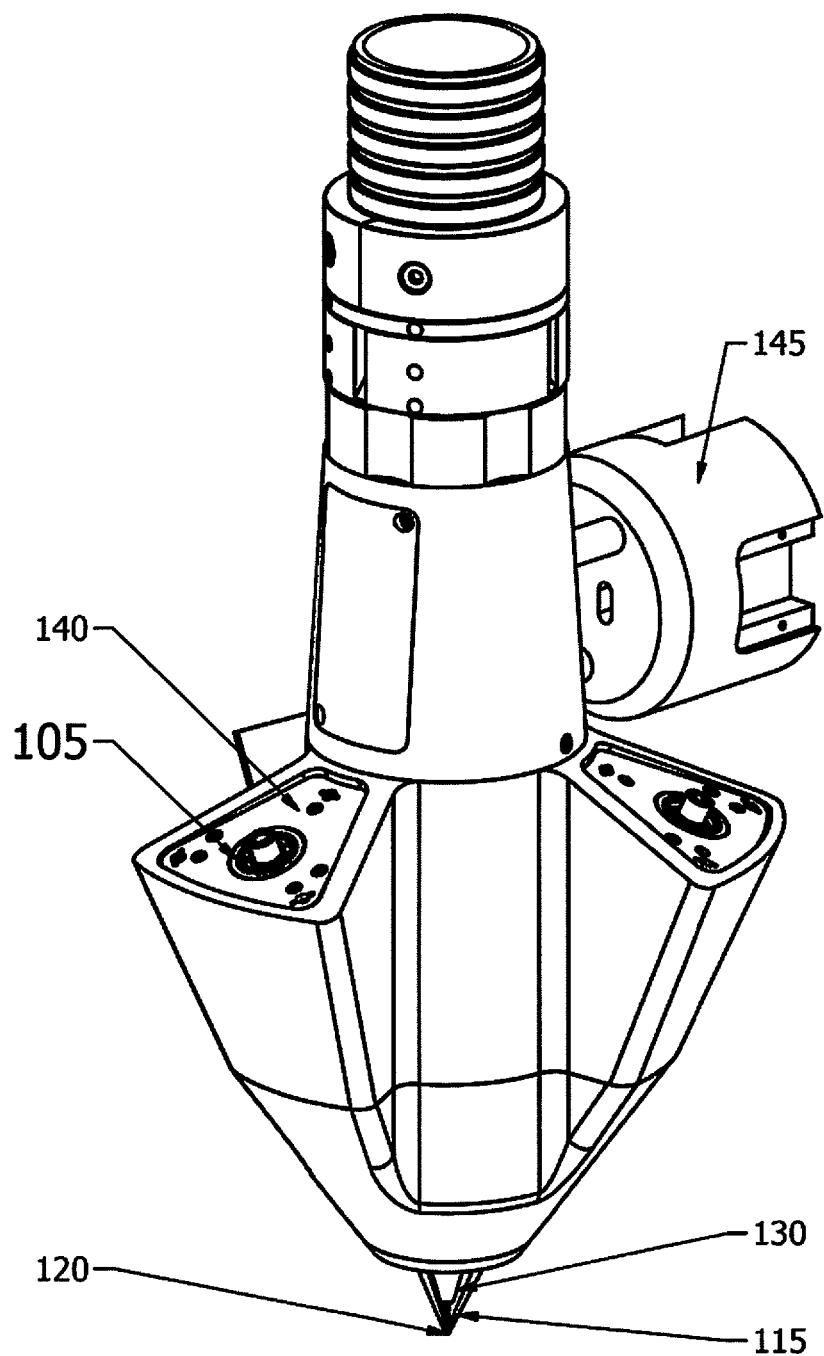
FIG. 3A and FIG. 3B show a perspective and expanded view of an embodiment for a multi-mode laser device for metal manufacturing applications illustrating its plurality of laser beams emanating from a plurality of laser sources, including but not exclusively, external fiber-coupled diode laser(s) or external fiber-coupled diode-pumped solid state laser(s) (DPSSL), or internal fiber-coupled or fiber-free solid-state diode lasers or solid-state lasers. The multiple lasers are configured as insertable laser assemblies which are precision adjustable and securable with locking mechanisms to deliver high-effective power to a precisely oriented focal point comprising the energy source of the laser manufacturing process.
Figure 3B:
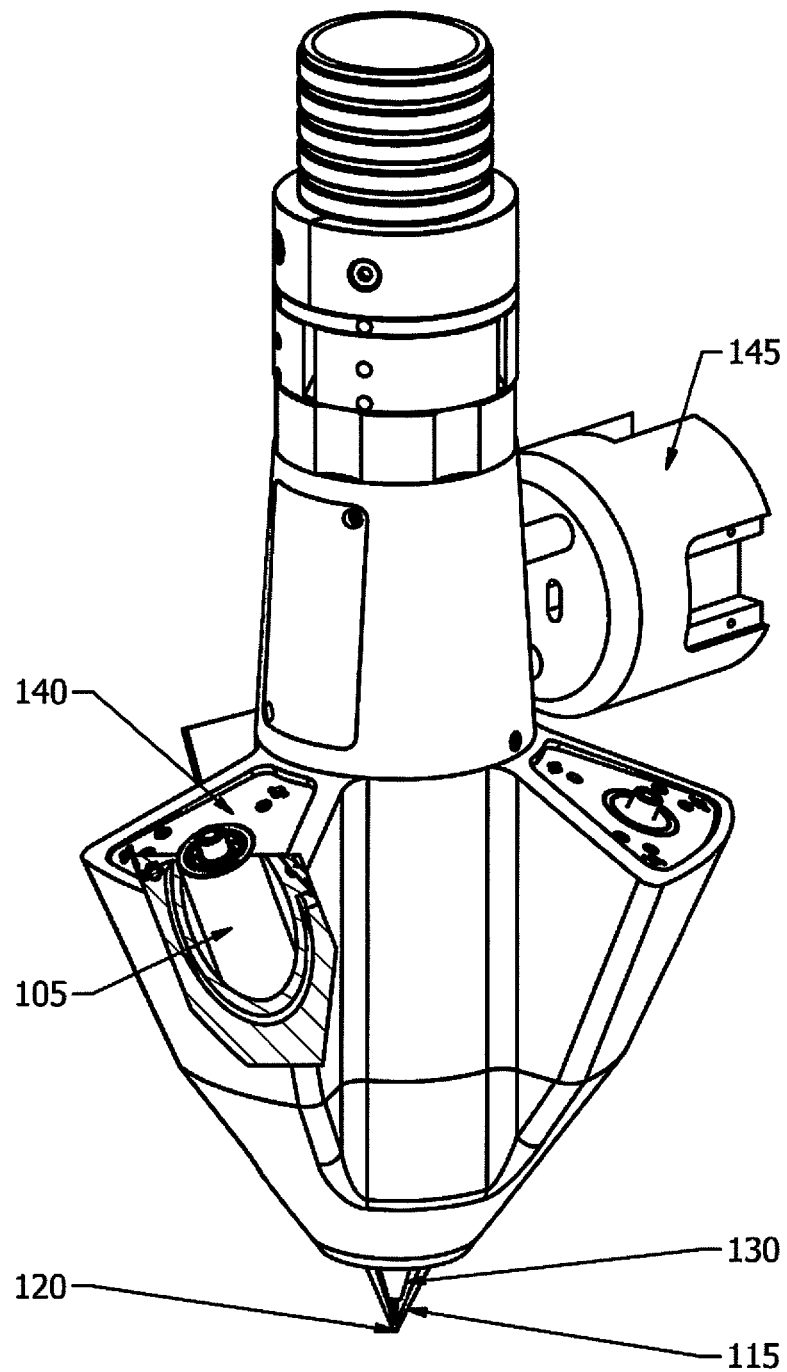

FIG. 3A and FIG. 3B show a perspective and expanded view of an embodiment for a multi-mode laser device for metal manufacturing applications illustrating its plurality of laser beams (115) emanating from a plurality of laser light sources (105), including but not exclusively, external fiber-coupled diode laser(s) or external fiber-coupled diode-pumped solid state laser(s) (DPSSL), or internal fiber-coupled or fiber-free solid-state diode lasers. The multiple lasers are configured as insertable laser assemblies (140) which are precision adjustable and securable with locking mechanisms (140) to deliver high-effective power to a precisely oriented focal point (120) comprising the energy source of the laser manufacturing process. Also shown in FIG. 3A and FIG. 3B are the mounting structure for the multi-mode laser device (145) and a central deposition nozzle (130).

Figure 12A:
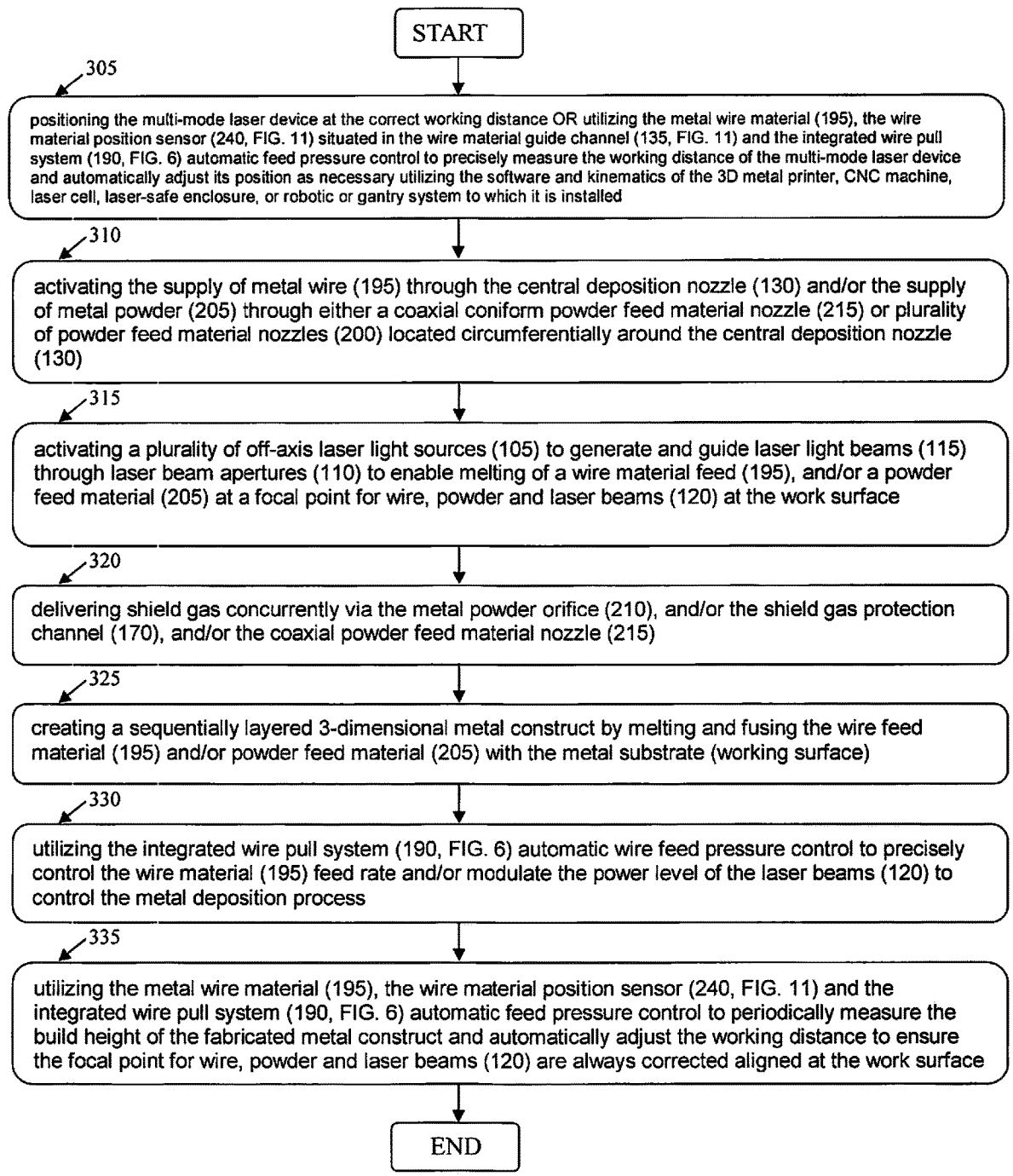
FIG. 12A, FIG. 12B, FIG. 12C, and FIG. 12D show a method for AM, laser cladding or laser welding (non-autogenous mode) using metal wire and metal powder (independently or simultaneously) through a single device with a plurality of off-axis laser beams.
Figures 12B, 12C, 12D:
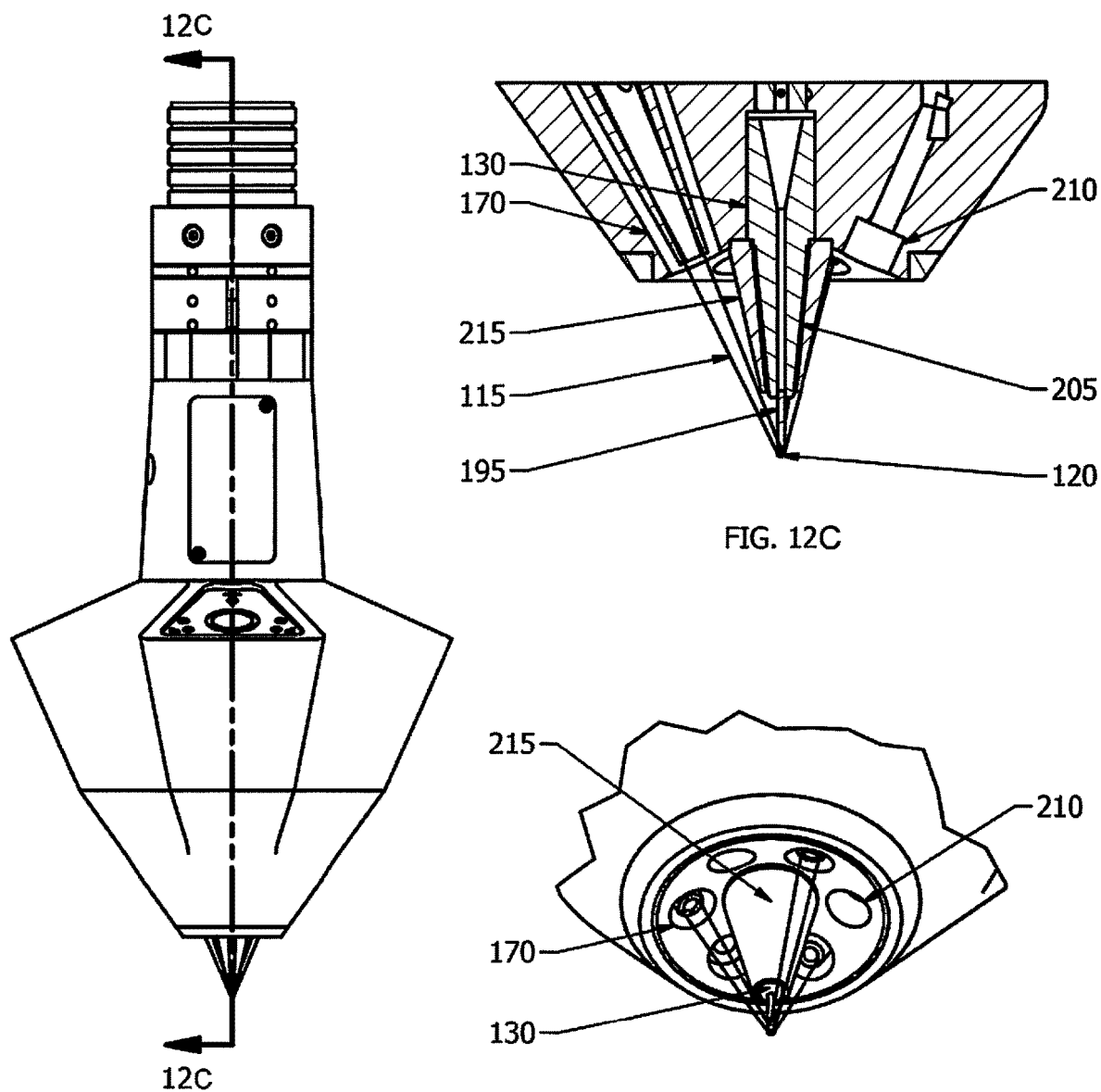
Figure 13A:
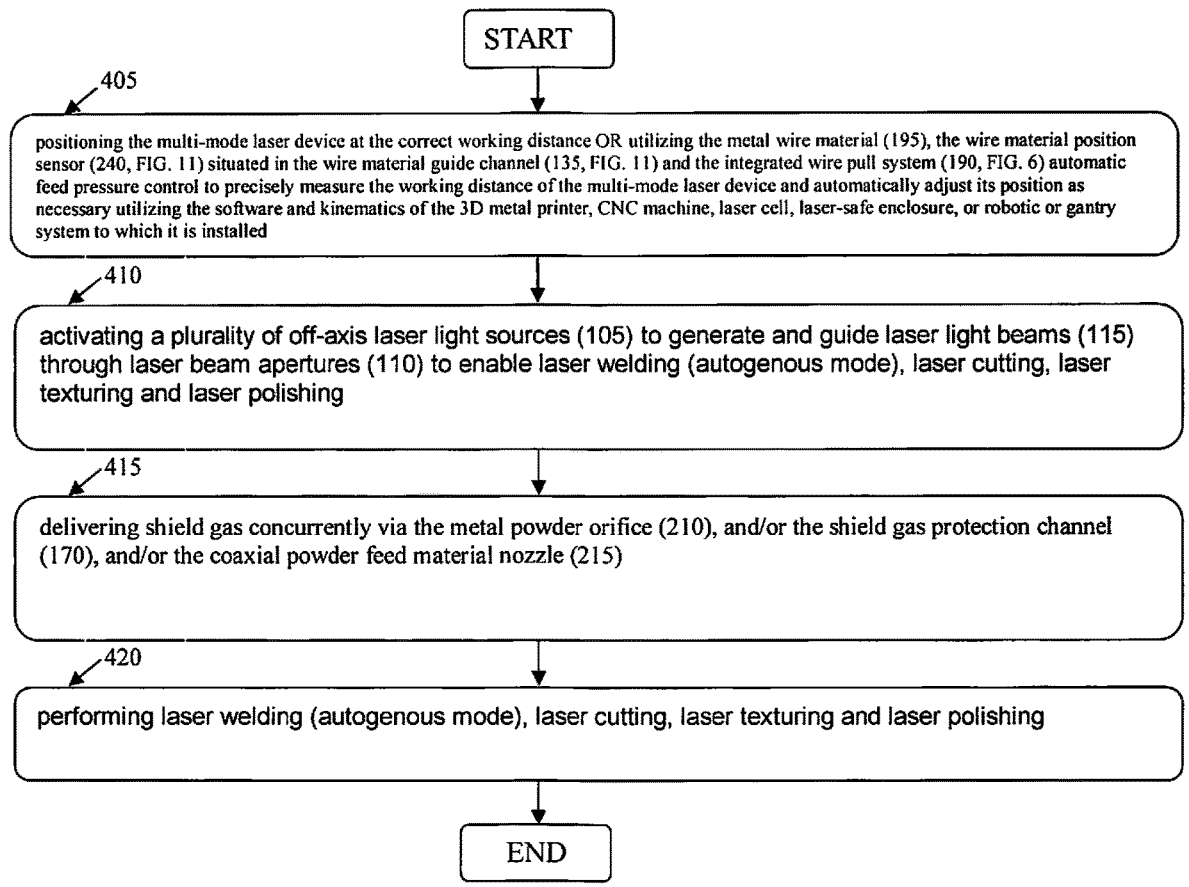
FIG. 13A, FIG. 13B, FIG. 13C, and FIG. 13D show a method for laser welding (autogenous mode), laser cutting, laser texturing and laser polishing through a single device with a plurality of off-axis laser beams.
Figure 13B:
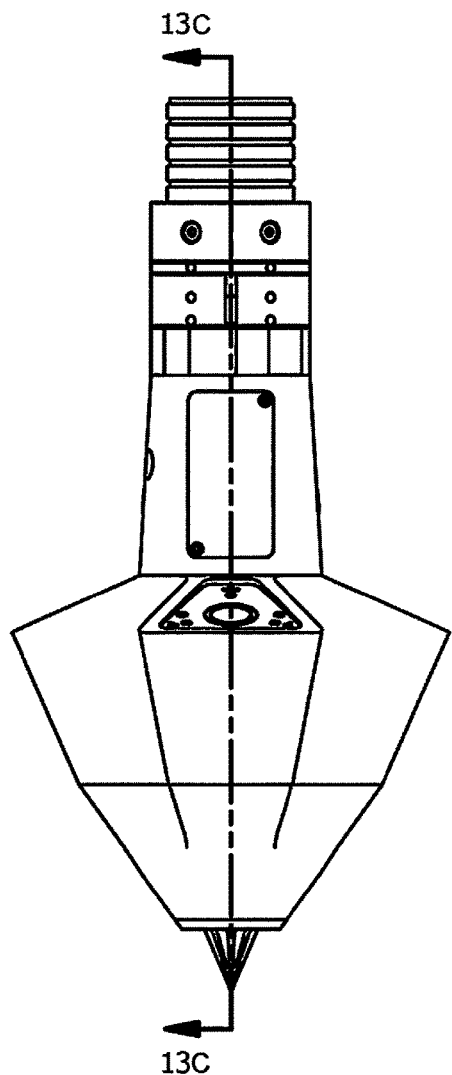
Figure 13C:
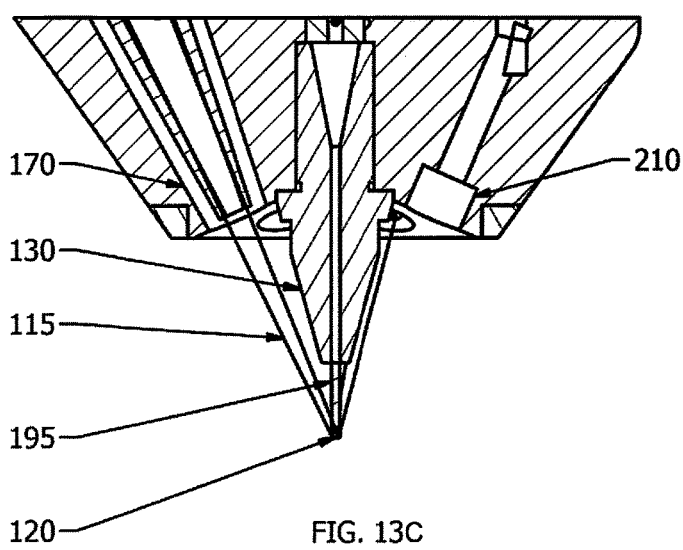
Figure 13D:
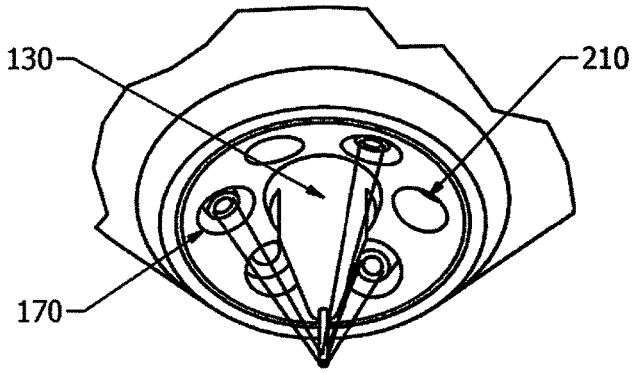

The plurality of off-axis laser beams (115) emanating from a plurality of laser light sources (105), including but not exclusively, external fiber-coupled diode laser(s) or external fiber-coupled diode-pumped solid state laser(s) (DPSSL), or internal fiber-coupled or fiber-free solid-state diode lasers provides laser energy to a precisely oriented focal point (120) comprising the energy source of the laser manufacturing processes described in FIG. 12 for AM, laser cladding or laser welding (non-autogenous mode) using metal wire and metal powder (independently or simultaneously) through with a plurality of off-axis laser beams and FIG. 13 for laser welding (autogenous mode), laser cutting, laser texturing and laser polishing with a plurality of off-axis laser beams.

The plurality of off-axis laser light sources (105) deliver laser beams (115) to the focal point of the laser manufacturing processes (120). The design of the insertable laser assemblies which are precision adjustable and securable with locking mechanisms (140), allows for precisely aligning the of off-axis laser light sources (105) to ensure that the laser beams (115) converge to the focal point of the laser manufacturing process (120).

In some embodiments, the design of the multi-mode laser device allows for angular variation in the inclination of the laser beams (115) from vertical, to facilitate process optimization for energy efficiency of the melting zone created at the focal point of the laser beams (120), and optimization against other considerations such as minimizing the possibility of specular reflection (either back reflection or reflection into another laser lens/fiber assembly) which could damage the laser light sources (105). In some embodiments the plurality of off-axis laser beams (115) are inclined 1 to 30 degrees from vertical. In some embodiments the plurality of off-axis laser beams (115) are inclined 30 to 60 degrees from vertical.

The mounting structure for the multi-mode laser device (145) enables securing the laser device within a print enclosure, robotic system, gantry system, or computer numeric control system, or another machine.

Figure 4A:
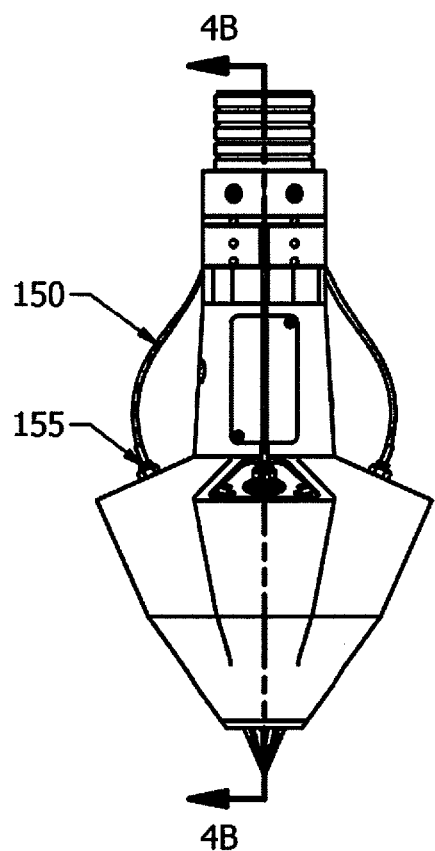
FIG. 4A and FIG. 4B show a perspective and cut-away view of an external fiber-coupled insertable laser assembly for an embodiment of a multi-mode laser device for metal manufacturing applications, illustrating the arrangement of the laser fibers, laser-fiber couplings, collimation and focusing optics, shield gas protection and cooling system.
Figure 4B:
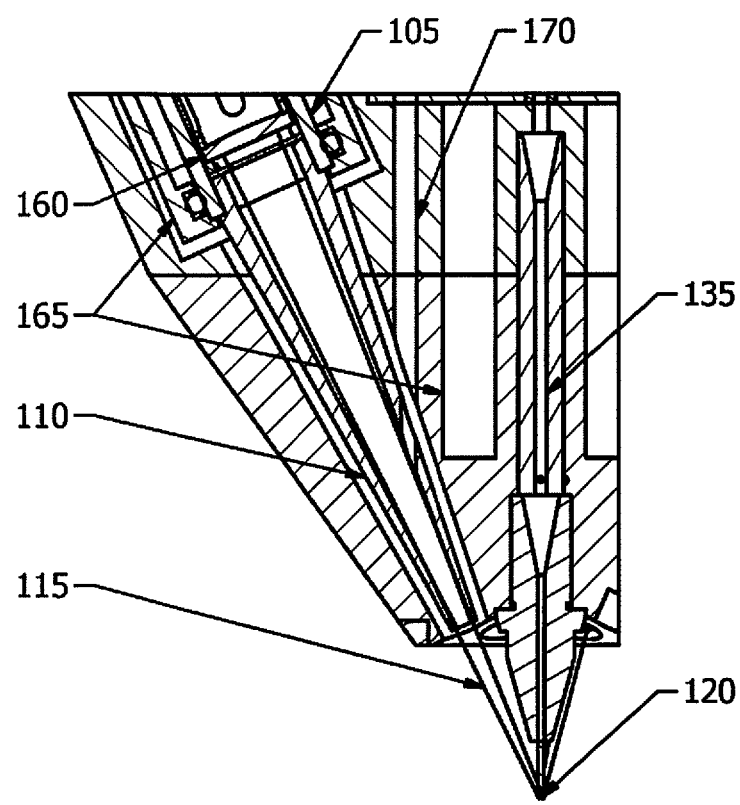

FIG. 4A and FIG. 4B show a perspective and cut-away view of an external fiber-coupled insertable laser assembly for an embodiment of a multi-mode laser device for metal manufacturing applications, illustrating the arrangement of the laser fibers (150), laser fiber couplings (155), collimation and focusing optics (160), laser beam apertures (110), shield gas protection (170) and cooling system (165). Each laser beam aperture (110) encloses its respective laser beam (115) and is designed with a precisely manufactured aperture at its exit point to minimize the possibility of specular reflection (either back reflection or reflection into another laser lens/fiber assembly) which could damage the laser light sources (105). Protective shield gas is delivered through the shield gas protection channel (170) to reduce the potential for particulate, dust or smoke entering the laser beam aperture (110) and causing damage to the collimation and focusing optics (160). The protective shield gas delivered through the shield gas protection channel (170) also facilitates the delivery of an inert gas to the focal point of the laser manufacturing process (120), which is desirable for AM, laser cladding, laser welding, laser cutting, laser texturing and laser polishing processes to reduce oxidation in the heat affected zone.

The main body of the multi-mode laser device provides structure and support for the insertable laser assemblies. The off-axis configuration of laser light sources (105) allows for the incorporation of a single or multiple laser beams (115) in the multi-mode laser device. In the base configuration, three off-axis laser light sources (105) are employed, with 120 degree rotational symmetry between each laser light source (105), although other off-axis configurations are viable and may be used in some embodiments. The design benefits from the off-axis laser architecture because it allows for scaling of laser power by incorporating additional laser light sources (105) circumferentially, and by allowing for on-axis powder and wire material feeds, as illustrated and discussed for FIG. 7 and FIG. 8.

Some configurations may use lasers of different wavelengths and power. In some embodiments, the plurality of laser light sources (105) emit laser light of an infrared spectrum light at a wavelength of between approximately 700 nm and 1 mm. In some embodiments, the plurality of laser light sources emit laser light of a visible spectrum light at a wavelengths of between approximately 400 and 700 nm. In some embodiments, the plurality of laser light sources emit laser light of an ultraviolet spectrum light at a wavelength of between approximately 180 and 400 nm. Other wavelengths may be used as suitable to the feed materials used in the laser manufacturing process.

FIG. 5A and FIG. 58 show a perspective and cut-away view of an internal fiber-coupled or fiber-free insertable laser assembly for an embodiment of a multi-mode laser device for metal manufacturing applications, illustrating the arrangement of the internal solid state diode laser(s) (175), collimation and focusing optics (160), shield gas protection (170), back-reflection protection (185), integrated aiming beam (180), and cooling system (165). The actual arrangement of the collimation and focusing optics (160), back-reflection protection (185) and integrated aiming beam (180) may vary in other embodiments depending on constraints associated with the laser manufacturing application which could require additional laser power, additional protection feature (185) is achieved through a photosensor which is positioned to receive and detect back-reflection and permit rapid momentary deactivation of the respective laser assembly.

The design shown in FIG. 5A and FIG. 5B is flexible to allow the incorporation of a single or multiple internal solid state diode laser(s) (175) within each internal fiber-coupled or fiber-free insertable laser assembly, which allows for an increase in the maximum laser power delivered to the process through the incorporation of additional solid state diode lasers (175) in each laser assembly. For embodiments featuring higher power configurations with more than a single internal solid state diode laser (175), the arrangement of the collimation and focusing optics (160), back-reflection protection (185) and integrated aiming beam (180) may be adjusted, however, the basic architecture and concept remains the same as shown in FIG. 5. The main body of the multi-mode laser device provides structure and support for the insertable laser assemblies. The off-axis configuration of laser light sources (105) allows for the incorporation of a single or multiple laser beams (115) in the multi-mode laser device. In the base configuration, three off-axis laser light sources (105) are employed, with 120 degree rotational symmetry between each laser light source (105), although other off-axis configurations are viable and may be used in some embodiments. The design benefits from the off-axis laser architecture because it allows for scaling of laser power by incorporating additional laser light sources (105) circumferentially, and by allowing for on-axis powder and wire material feeds, as illustrated and discussed for FIG. 7 and FIG. 8.

Some configurations may use lasers of different wavelengths and power. In some embodiments, the plurality of laser light sources (105) emit laser light of an infrared spectrum light at a wavelength of between approximately 700 nm and 1 mm. In some embodiments, the plurality of laser light sources emit laser light of a visible spectrum light at a wavelengths of between approximately 400 and 700 nm. In some embodiments, the plurality of laser light sources emit laser light of an ultraviolet spectrum light at a wavelength of between approximately 180 and 400 nm. Other wavelengths may be used as suitable to the feed materials used in the laser manufacturing process.

Figure 6:
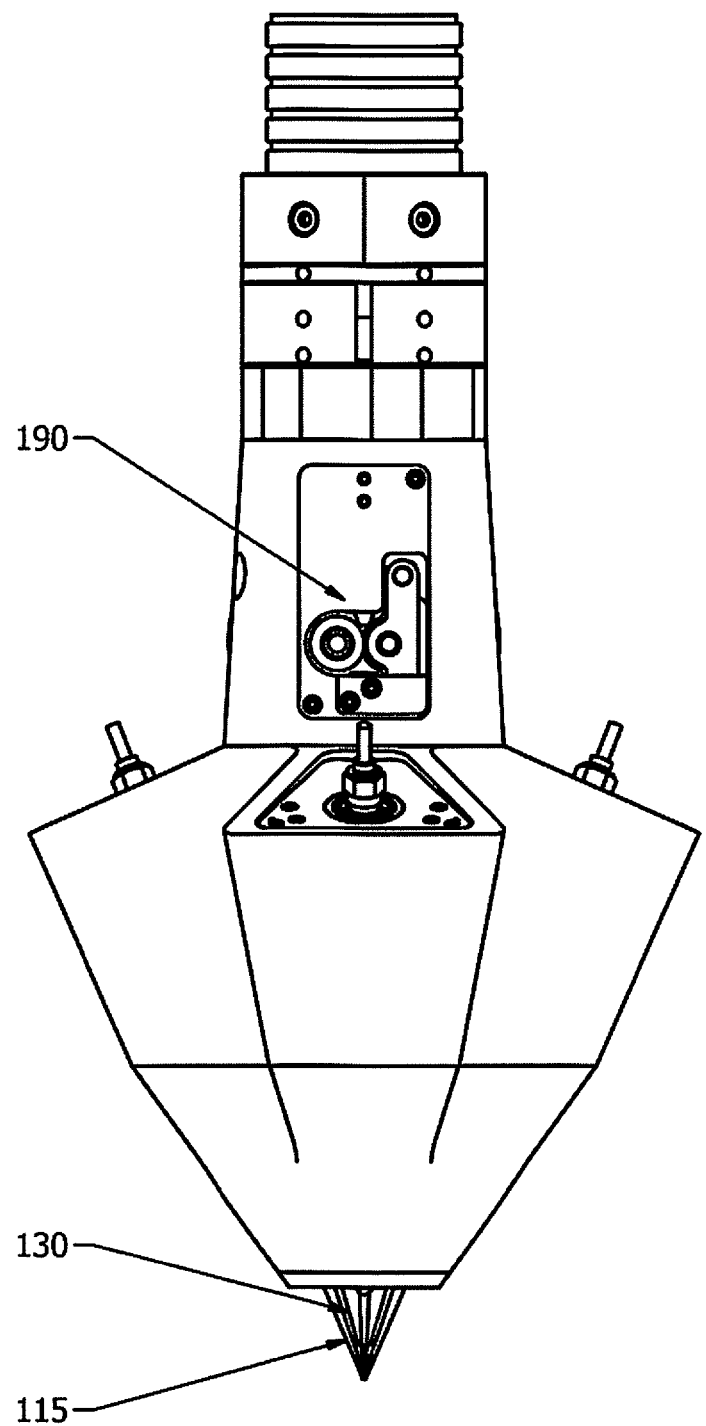
FIG. 6 shows a perspective view of an embodiment for a multi-mode laser device for metal manufacturing applications featuring its integrated wire feed (pull) system.

FIG. 6 shows a perspective view of an embodiment for a multi-mode laser device for metal manufacturing, applications featuring its integrated wire feed (pull) system (190). Also shown in FIG. 6 is the associated wire material guide channel (135). In some embodiments, the integrated wire feed (pull) system (190) is housed within the mounting structure of the laser device (145, FIG. 3A). In other embodiments, the integrated wire feed (pull) system (190) is situated outside the mounting structure of the laser device (145, FIG. 3A).

The integrated wire pull system (190) with automatic feed pressure control serves as a control mechanism for pulling deposition wire from the wire supply spool situated within the adjoining equipment and delivering deposition wire to the central deposition nozzle (130, FIG. 3A) where it is used in laser manufacturing process for AM, laser cladding or laser welding (nonautogenous mode) by intersecting with the focal point of the laser beams (120). The feed pressure of the wire is regulated by automatically measuring the torque of the wire pull system (190) motor and adjusting the motor current to adjust wire feed rate and maintain a steady state wire feed pressure. In other embodiments, the feed pressure of the wire is used in software to automatically modulate the power level of the laser beams (120) to provide optimal control of the metal deposition process. In other embodiments, the wire feed rate and power level of the laser beams (120) are adjusted independently or simultaneously.

Figure 7:
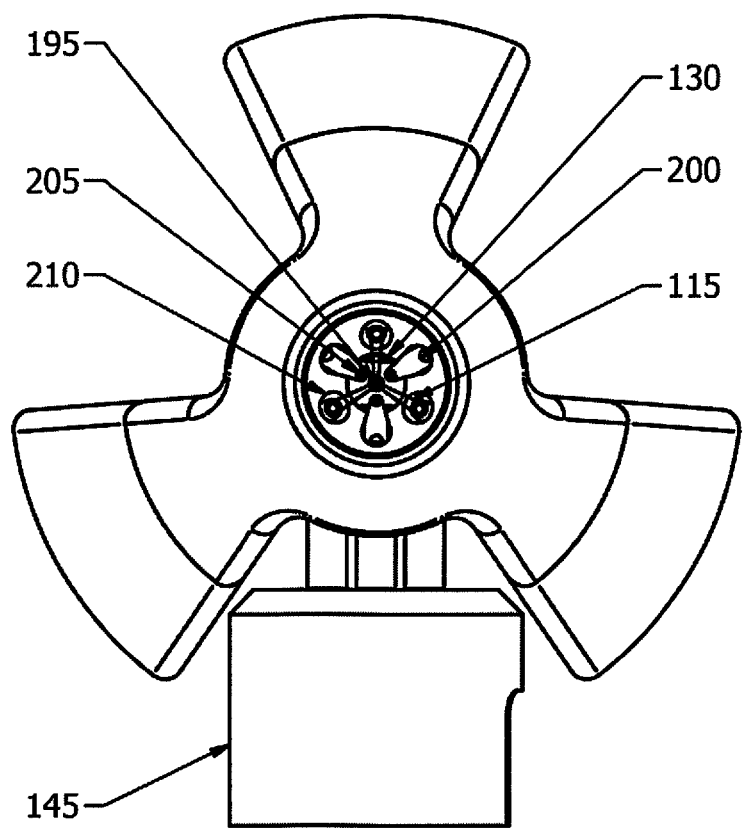
FIG. 7 shows a bottom view of an embodiment for a multi-mode laser device for metal manufacturing applications featuring the underside of the device illustrating its central deposition nozzle with wire feed material orifice, powder feed material nozzles, powder feed material nozzle orifices, process gas orifices and laser beams.

FIG. 7 shows a bottom view of an embodiment for a multi-mode laser device for metal manufacturing applications featuring the underside of the device illustrating its central deposition nozzle (130) for supplying wire feed material (195), powder feed material nozzles (200) for supplying powder feed material (205), process gas orifices (210) and laser beams (115).

Not shown in FIG. 7 is an optional nozzle cowling (220, FIG. 9) which may be installed as shown in FIG. 9 for some embodiments of the multi-mode laser device. The nozzle cowling (220, FIG. 9) may provide improvements in the distribution of process and shield gas in some laser manufacturing applications.

Figure 8:
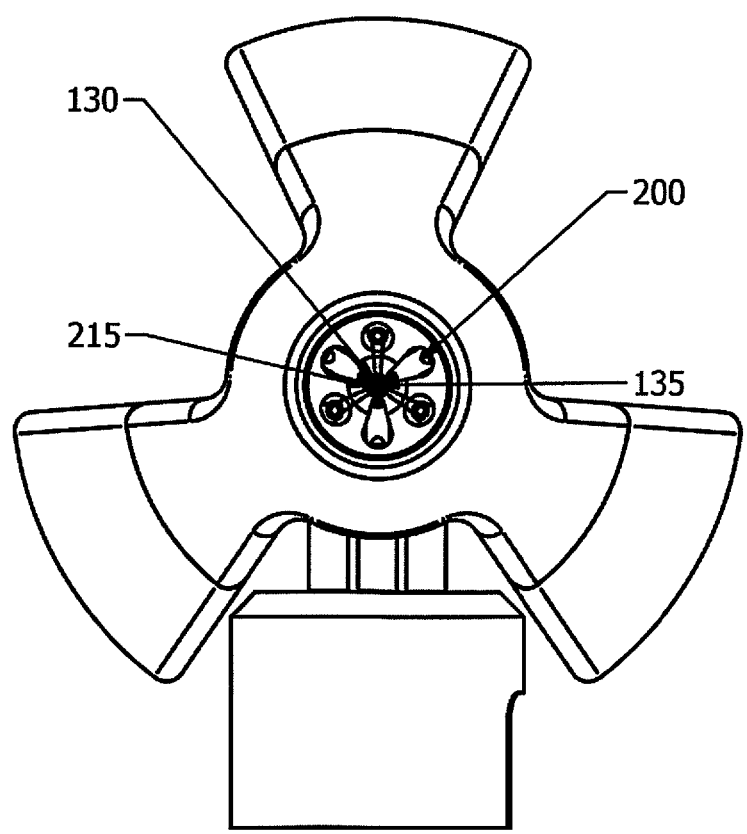
FIG. 8 shows a bottom view of an embodiment for a multi-mode laser device for metal manufacturing applications featuring two methods for delivering, powder coaxially as either a coniform nozzle supplied distribution or multiple independent off-axis powder nozzles providing, individual collimated jets of powder located circumferentially surrounding the wire feed channel.

FIG. 8 shows a bottom view of an embodiment for a multi-mode laser device for metal manufacturing applications featuring two methods for delivering powder coaxially. The first method consists of a coaxial coniform powder feed material nozzle (215) which encloses the central deposition nozzle (130) and wire material guide channel (135) and provides a coniform distribution of powder coaxially to the focal point for wire, powder and laser beams (120, FIG. 1) at the working surface. The second method consists of multiple independent off-axis powder feed material nozzles (200) located circumferentially around the central deposition nozzle (130) providing individual collimated jets of powder to the focal point for wire, powder and laser beams (120, FIG. 1) at the working surface.

FIG. 9A and FIG. 9B show a perspective and cut-away view of an embodiment for a multi-mode laser device for metal manufacturing applications featuring its process gas distribution and supply channels (210) to the working surface of the process, in conjunction with a detachable nozzle cowling (220). The detachable and optional nozzle cowling (220) may provide improvements in the distribution of process and shield gas in some laser manufacturing applications. The process gas channels (210) provide the capability to supply inert gas, for example argon, to the focal point for wire, powder and laser beams (120, FIG. 1) at the working surface.

Figures 10A, 10B, 10C:
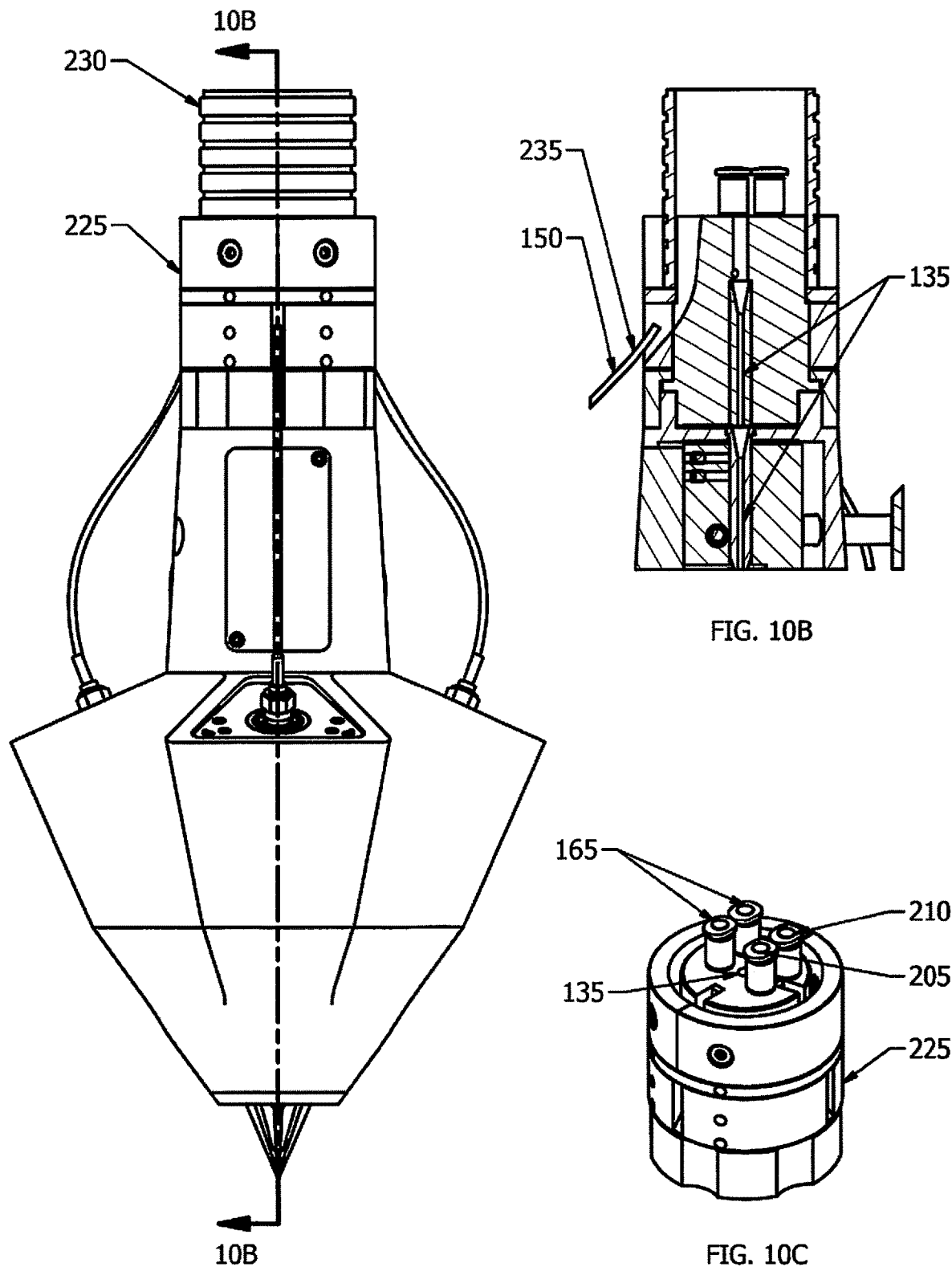
FIG. 10A, FIG. 10B and FIG. 10C show a perspective, cut-away and expanded view of an embodiment for a multi-mode laser device for metal manufacturing applications featuring its head supply neck coupling which facilitates a quick-disconnect and rapid reconnection of the laser device to the incoming, supply lines contained in the supply conduit. The supply lines comprise electrical, water cooling, process gas, wire material guide channel and powder feed connections, in addition to routing/management of laser fibers for external fiber-coupled diode laser(s) or external fiber-coupled DPSSLs.

FIG. 10A, FIG. 10B and FIG. 10C show a perspective, cut-away and expanded view of an embodiment for a multi-mode laser device for metal manufacturing applications featuring its head supply neck coupling (225) which facilitates a quick-disconnect and rapid reconnection of the laser device to the incoming supply lines contained in the supply conduit (230). The supply lines comprise electrical (245), water cooling (165), process gas (210), wire material guide channel (135) and powder feed channel (205) quick disconnect/reconnect connections, in addition to routing/management (235) of laser fibers (150) for external fiber-coupled diode laser(s) or external fiber-coupled DPSSLs. The water cooling line fittings (165) provide an inlet and exit for cooling water to maintain the multi-mode laser device at operational temperature. The coolant may be a liquid fluid, such as water.

Also shown in FIG. 10B are cone shaped features of the wire material guide channel (135) which help to guide the wire material from the supply conduit (230) through the supply neck coupling (225) and into the wire material guide channel (135) of the multi-mode laser device. In some embodiments, these cone shaped features also facilitate the passage and interchange of wires when more than one metal wire is used in the process.

Figures 11A, 11B:
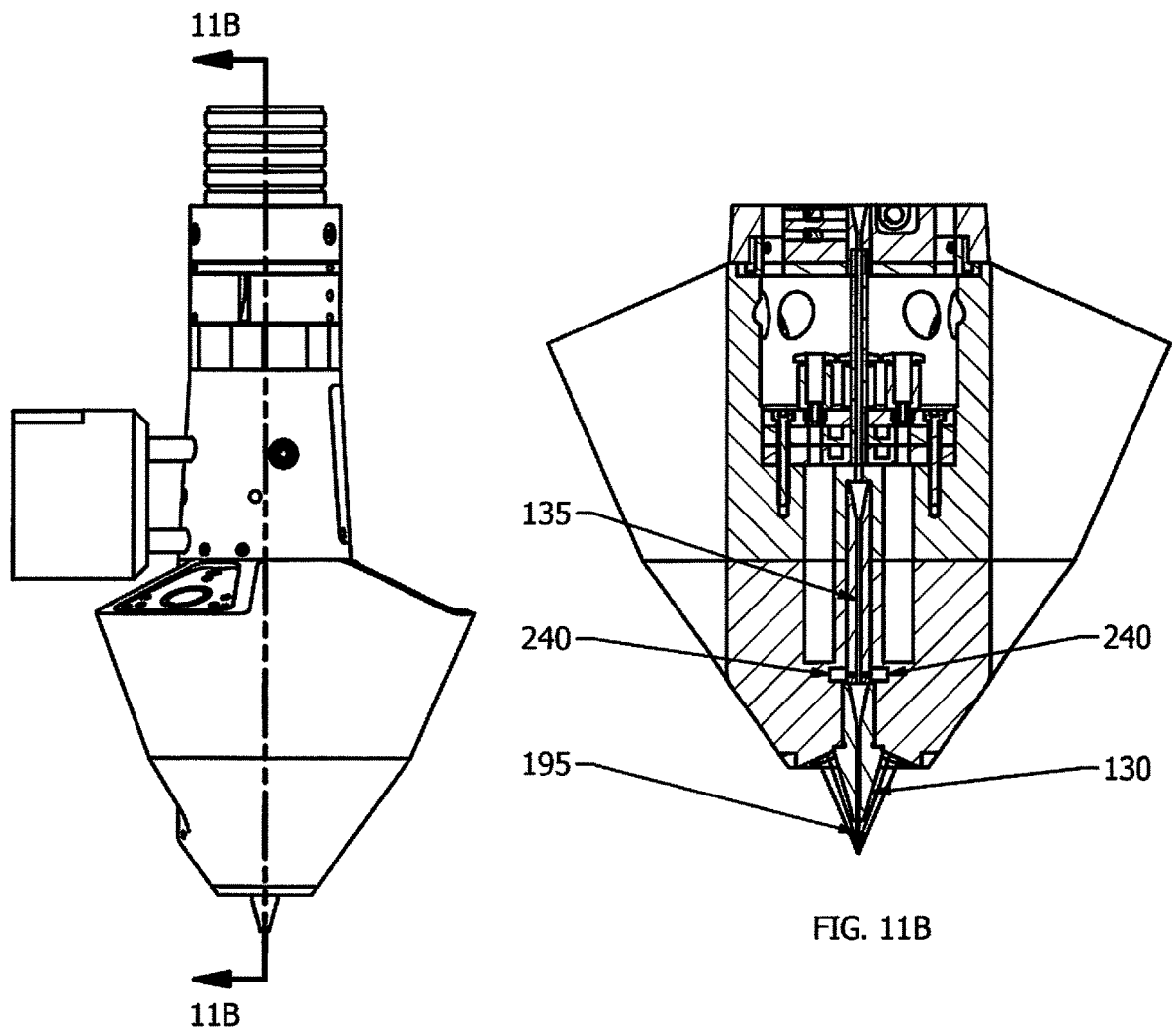
FIGS. 11A and 11B shows a perspective and cut-away view of an embodiment for a multi-mode laser device for metal manufacturing applications featuring a wire material position sensor for automatically detecting the tip of the wire feed material as it is retracted into the nozzle allow automatic precise control of the distance of the nozzle to the working surface by using the wire feed material as a distance measuring probe.

FIG. 11A and FIG. 11B show a perspective and cut-away view of an embodiment for a multi-mode laser device for metal manufacturing applications featuring a wire material position sensor (240) for automatically detecting the tip of the wire feed material (195) as it is retracted through the central deposition nozzle (130) and into the wire material guide channel (135). The wire material position sensor uses a photoelectric, capacitive or hall-effect electrical sensor to automatically control the precise distance of the multi-mode laser device central deposition nozzle (130) tip to the working surface by using the wire feed material (195) as a distance measuring probe. This is achieved by detecting the exact position of the tip of the wire feed material (195) as it is retracted up through the wire material, guide channel (135), and then using this information in software, combined with the integrated wire pull system (190, FIG. 6) automatic feed pressure control to precisely insert the wire the exact distance to the focal point of the laser manufacturing process (120, FIG. 3A).

FIG. 12A, FIG. 12B, FIG. 12C, and FIG. 12D show a method for AM, laser cladding or laser welding (non-autogenous mode) using metal wire (195) and metal powder (205), independently or simultaneously, through a single device with a plurality of off-axis laser beams (115). In this embodiment, the metal powder feed can be supplied via a coaxial powder feed material nozzle (215, FIG. 8) which encloses the central deposition nozzle (130, FIG. 8) and wire material guide channel (135, FIG. 8) or through multiple independent off-axis powder feed material nozzles (200, FIG. 8) located circumferentially around the central deposition nozzle (130, FIG. 8) providing individual collimated jets of powder to the focal point for wire, powder and laser beams (120, FIG. 1) at the working surface.

At step 305, manually positioning the multi-mode laser device at the correct working distance OR utilizing the metal wire material (195), the wire material position sensor (240, FIG. 11) situated in the wire material guide channel (135, FIG. 11) and the integrated wire pull system (190, FIG. 6) automatic feed pressure control to precisely measure the working distance of the multi-mode laser device and automatically adjust its position as necessary utilizing the software and kinematics of the 3D metal printer, CNC machine, laser cell, laser-safe enclosure, or robotic or gantry system to which it is installed.

At step 310, activating the supply of metal wire (195) through the central deposition nozzle (130) and/or the supply of metal powder (205) through either a coaxial coniform powder feed material nozzle (215) or plurality of powder feed material nozzles (200) located circumferentially around the central deposition nozzle (130).

At step 315, activating a plurality of off-axis laser light sources (105) to generate and guide laser light beams (115) through laser beam apertures (110) to enable melting of a wire material feed (195), and/or a powder feed material (205) at a focal point for wire, powder and laser beams (120) at the work surface.

At step 320, delivering shield gas concurrently via the metal powder orifice (210), and/or the shield gas protection channel (170), and/or the coaxial powder feed material nozzle (215).

At step 325, creating a sequentially layered 3-dimensional metal construct by melting and fusing the wire feed material (195) and/or powder feed material (205) with the metal substrate (working surface).

At step 330, utilizing the integrated wire pull system (190, FIG. 6) automatic wire feed pressure control to precisely control the wire material (195) feed rate and/or modulate the power level of the laser beams (120) to control the metal deposition process.

At step 335, utilizing the metal wire material (195), the wire material position sensor (240, FIG. 11) and the integrated wire pull system (190, FIG. 6) automatic feed pressure control to periodically measure the build height of the fabricated metal construct and automatically adjust the working distance to ensure the focal point for wire, powder and laser beams (120) are always corrected aligned at the work surface.

FIG. 13A, FIG. 13B, FIG. 13C, and FIG. 13D show a method for laser welding (autogenous mode), laser cutting, laser texturing and laser polishing through a single device with a plurality of off-axis laser beams (115). In this embodiment, metal powder and metal wire feedstock are not used by the process and only the laser beams (115) are employed. However, the metal powder feed channels (coaxial nozzle (215, FIG. 8) and/or multiple independent off-axis powder feed material nozzles (200, FIG. 8)) may be used to supply shield gas to protect the build surface from oxidation effects. In addition, metal wire material (195) may be present and used for the purpose of serving as a distance measuring probe as described in step 405.

At step 405, manually positioning the multi-mode laser device at the correct working distance OR utilizing the metal wire material (195), the wire material position sensor (240, FIG. 11) situated in the wire material guide channel (135, FIG. 11) and the integrated wire pull system (190, FIG. 6) automatic feed pressure control to precisely measure the working distance of the multi-mode laser device and automatically adjust its position as necessary utilizing the software and kinematics of the 3D metal printer, CNC machine, laser cell, laser-safe enclosure, or robotic or gantry system to which it is installed.

At step 410, activating a plurality of off-axis laser light sources (105) to generate and guide laser light beams (115) through laser beam apertures (110) to enable laser welding (autogenous mode), laser cutting, laser texturing and laser polishing.

At step 415, delivering shield gas concurrently via the metal powder orifice (210), and/or the shield gas protection channel (170), and/or the coaxial powder feed material nozzle (215).

At step 420, performing laser welding (autogenous mode), laser cutting, laser texturing and laser polishing.

These descriptions and drawings are embodiments and teachings of the disclosure. All variations are within the spirit and scope of the disclosure. This disclosure is not to be considered as limiting the claims to only the embodiments illustrated or discussed.

Certain changes can be made in the subject matter without departing from the spirit and the scope of this invention. Changes are possible within the scope of this invention. Each structure or element recited in any claim also refers to all equivalent structures or elements. The following claims are intended to cover the invention as broadly as possible in whatever form it may be used.

We claim:

1. A multi-mode laser device comprising:
   a. an integrated wire pull system with automatic feed pressure control capable of delivering a metal wire from a central axis wire feed guide tube through a central deposition nozzle in the concurrent deposition housing to a focal point for wire, powder and laser,
   b. a plurality of off-axis laser light sources for delivering laser light beams to a focal point at the work surface, wherein the plurality of off-axis laser light sources comprises a plurality of insertable laser assemblies comprising internal solid-state diode lasers comprising back-reflection protection through a photo-sensor to detect back-reflection and permit rapid momentary deactivation of the respective laser assembly,
c. a shield gas delivery system capable of delivering shield gas to the focal point for wire, powder and laser,
d. a cooling system, and capable of
e. performing additive manufacturing (AM), laser cladding, laser welding (autogenous and non-autogenous), laser cutting, laser texturing and laser polishing and capable of
f. performing additive manufacturing using metal wire and metal powder simultaneously, through the implementation of independent coaxial wire and powder feed channels.

2. The multi-mode laser device of claim 1 wherein the plurality of off-axis laser light sources comprises a plurality of external fiber-coupled solid-state diode lasers.

3. The multi-mode laser device of claim 1 wherein the plurality of off-axis laser light sources comprises a plurality of external fiber-coupled diode-pumped solid-state lasers.

4. The multi-mode laser device of claim 1 wherein the plurality of off-axis laser light sources comprises a plurality of internal fiber-coupled solid-state diode lasers.

5. The multi-mode laser device of claim 1 wherein the plurality of off-axis laser light sources comprises a plurality of internal fiber-free solid-state diode lasers.

6. The multi-mode laser device of claim 1 wherein the plurality of off-axis laser light sources comprises a plurality of insertable laser assemblies comprising secure locking mechanisms and capable of precision adjustment and capable of delivering high-effective power to a precisely oriented focal point.

7. The multi-mode laser device of claim 1 wherein the plurality of the insertable laser assemblies comprise a plurality of internal solid-state diode lasers capable of accommodating multiple diode lasers within one same laser assembly to facilitate increased laser power.

8. The multi-mode laser device of claim 1 wherein the plurality of insertable laser assemblies comprise a plurality of internal solid-state diode lasers each coordinated to a respective laser assembly and capable of aiming a beam to aid alignment of the respective laser assembly.

9. The multi-mode laser device of claim 1 wherein the plurality of laser light sources emits laser light of an infrared spectrum light.

10. The multi-mode laser device of claim 1 wherein the plurality of laser light sources emits laser light of a visible spectrum light.

11. The multi-mode laser device of claim 1 wherein the plurality of laser light sources emits laser light of an ultraviolet spectrum light.

12. The multi-mode laser device of claim 1 further comprising a removable shield gas cowling for diffusing shield gas onto a working surface.

13. The multi-mode laser device of claim 1 wherein a plurality of off-axis laser light lens assemblies are inclined from 1 to 60 degrees inclusive from vertical.

14. The multi-mode laser device of claim 1 wherein the wire feed channel incorporates a wire material position sensor for automatically detecting a tip of a wire feed material as the wire feed material is retracted through the central deposition nozzle and into a wire material guide channel.

15. The multi-mode laser device of claim 14 wherein the wire material position sensor comprises a photoelectric sensor capable of automatically controlling a precise distance of a multi-mode laser device central deposition nozzle tip to a working surface by
  detecting the exact position of the tip of the wire feed material as the wire feed material is retracted up through the wire material guide channel, and
  calculating an integrated wire pull system automatic feed pressure control to precisely insert the wire an exact distance to a focal point of the laser manufacturing process.

16. The multi-mode laser device of claim 14 wherein the wire material position sensor comprises a capacitive sensor capable of automatically controlling a precise distance of a multi-mode laser device central deposition nozzle tip to a working surface by
  detecting an exact position of a tip of a wire feed material as the wire feed material is retracted up through the wire material guide channel, and
  calculating an integrated wire pull system automatic feed pressure control to precisely insert the wire an exact distance to a focal point of the laser manufacturing process.

17. The multi-mode laser device of claim 14 wherein the wire material position sensor comprises a hall-effect electrical sensor capable of automatically controlling a precise distance of a multi-mode laser device central deposition nozzle tip to a working surface by
  detecting the exact position of the tip of a wire feed material as the wire feed material is retracted up through the wire material guide channel, and
  calculating an integrated wire pull system automatic feed pressure control to precisely insert the wire an exact distance to a focal point of the laser manufacturing process.

18. The multi-mode laser device of claim 14 wherein the wire feed channel comprises a cone shaped feature to facilitate guidance of the wire material from a supply conduit through a supply neck coupling and into the wire material guide channel of the multi-mode laser device.

19. The multi-mode laser device of claim 14 wherein the wire feed channel comprises a cone shaped feature to facilitate passage and interchange of an at least one wire from a plurality of metal wires.

20. The multi-mode laser device of claim 18 wherein a head supply neck coupling is capable of a quick-disconnect and rapid reconnection of the multi-mode laser device to an incoming supply line contained within the supply conduit wherein the supply line comprises electrical, water cooling, process gas, wire material guide channel and powder feed connections and capable of routing and management of laser fibers for external fiber-coupled diode laser(s) or external fiber-coupled DPSSLs.

21. The multi-mode laser device of claim 1 wherein powder coaxially is delivered as a coniform nozzle nested around the wire feed channel.

22. The multi-mode laser device of claim 1 wherein powder coaxially is delivered in multiple independent off-axis powder nozzles providing individual collimated jets of powder located circumferentially surrounding the wire feed channel.

23. The multi-mode laser device of claim 1 wherein the multi-mode laser device is capable of additive manufacturing, laser cladding and laser welding (nonautogenous mode) with at least one of metal wire and metal powder delivered with a plurality of off-axis laser beams and comprising a plurality of variable user-defined process parameters of deposition velocity, laser power, wire pressure control, and wire/powder feed rate inputted as control signals and capable of optimizing deposition quality.

24. The multi-mode laser device of claim 1 wherein laser welding (autogenous mode), laser cutting, laser texturing and laser polishing is achieved with a plurality of off-axis laser beams.

25. The multi-mode laser device of claim 23 further comprising material gradients and material blending by blending powders in the deposition nozzle or upstream of the deposition nozzle from multiple powder feeds.

26. The multi-mode laser device of claim 23 further comprising material gradients and material blending by blending powder(s) onto a wire feed matrix.

27. The multi-mode laser device of claim 23 further comprising material gradients and material blending by blending multiple wires.

28. The multi-mode laser device of claim 1 wherein the multi-mode laser device consists of a single device consisting of a feed deposition head, a plurality of off-axis laser beams, an inline process control system, an at least one powder feed material nozzle, a wire feed driver and precision control capable of using wire feed material as a distance measuring probe, and a shield gas protection.

29. The multi-mode laser device of claim 28 wherein the at least one powder feed material nozzle comprises an off-axis powder feed material nozzle.

30. The multi-mode laser device of claim 28 wherein the at least one powder feed material nozzle comprises a coaxial powder feed material nozzle.

\* \* \* \* \*